(12) United States Patent
Faizakov et al.

(10) Patent No.: US 8,428,241 B2
(45) Date of Patent: *Apr. 23, 2013

(54) SEMI-SUPERVISED TRAINING OF DESTINATION MAP FOR CALL HANDLING APPLICATIONS

(75) Inventors: Avraham Faizakov, Westmount (CA); S. Douglas Peters, Pointe-Claire (CA); Peter R. Stubley, Lanchine (CA)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/218,217

(22) Filed: Aug. 25, 2011

(65) Prior Publication Data
US 2011/0311038 A1   Dec. 22, 2011

Related U.S. Application Data

(63) Continuation of application No. 11/800,106, filed on May 4, 2007, now Pat. No. 8,009, 819.

(60) Provisional application No. 60/920,234, filed on Mar. 26, 2007.

(51) Int. Cl.
  *H04M 3/42* (2006.01)
  *H04M 1/64* (2006.01)

(52) U.S. Cl.
  USPC ................ 379/211.02; 379/88.01; 379/88.03; 379/212.01; 379/218.01

(58) Field of Classification Search ............. 379/211.02, 379/88.03, 88.01, 212.01, 218.01, 201.01, 379/265.02; 704/273
See application file for complete search history.

(56) References Cited

U.S. PATENT DOCUMENTS

| | | | |
|---|---|---|---|
| 4,979,206 | A | 12/1990 | Padden et al. |
| 5,488,652 | A | 1/1996 | Bielby et al. |
| 5,719,921 | A | 2/1998 | Vysotsky et al. |
| 5,802,149 | A | 9/1998 | Hanson |
| 5,835,570 | A | 11/1998 | Wattenbarger |
| 5,982,857 | A | 11/1999 | Brady |
| 6,243,684 | B1 | 6/2001 | Stuart et al. |
| 6,269,153 | B1 | 7/2001 | Carpenter et al. |
| 6,466,784 | B1 | 10/2002 | Cox et al. |

(Continued)

OTHER PUBLICATIONS

Goring, et al.; "Learning Spoken Language *without* Transcriptions"; Dec. 12, 1999; Proceedings Automatic Speech Recognition and Understanding Workshop, ASRU '99, Keystone, Colorado, USA.
PCT International Search Report and Written Opinion, PCT/US08/03775, mailed on 6/1108, 10 pages.

*Primary Examiner* — Thjuan K Addy
(74) *Attorney, Agent, or Firm* — Michael A. Glenn; Glenn Patent Group

(57) ABSTRACT

A method of semi-supervised synonym inference for a call handling application, such as automated directory assistance or call routing, is described. In one embodiment the method comprises examining a database of caller interaction results from a directory assistance system that includes an automated directory assistance engine, detecting a specified characteristic in the caller interaction results, and using the detected characteristic to automatically train a destination map, where the destination map is for use by the automated directory assistance engine in automatically mapping human speech to a destination. The detecting of the specified characteristic in the caller interaction results may include a statistical analysis of the caller interaction results for each of one or more speech recognition strings.

22 Claims, 10 Drawing Sheets

U.S. PATENT DOCUMENTS

| | | |
|---|---|---|
| 6,498,797 B1 | 12/2002 | Anerousis et al. |
| 7,092,888 B1 | 8/2006 | McCarthy et al. |
| 7,130,387 B2 * | 10/2006 | Maruyama ................. 379/88.01 |
| 7,356,131 B2 * | 4/2008 | Bishop et al. .............. 379/88.03 |
| 2002/0071527 A1 | 6/2002 | Ng et al. |
| 2005/0033582 A1 | 2/2005 | Gadd et al. |
| 2005/0069122 A1 | 3/2005 | Lin |
| 2006/0074685 A1 | 4/2006 | Brown et al. |

* cited by examiner

SEMI-SUPERVISED TRAINING OF DESTINATION MAP FOR CALL HANDLING APPLICATIONS

CROSS REFERENCE TO RELATED APPLICATIONS

This Application is a Continuation Application of U.S. patent application Ser. No. 11/800,106, filed 4 May 2007 now U.S. Pat. No. 8,009,819, entitled Semi-Supervised Training of Destination Map for Call Handling Applications, which claims priority to U.S. Provisional Patent Application Ser. No. 60/920,234, filed on 26 Mar. 2007 entitled Semi-Supervised Training of Destination Map for Call Handling Applications, each of which are incorporated herein in their entirety by this reference thereto.

This Application is also related to PCT Application No. PCT/US08/03775, filed on 21 Mar. 2008, entitled Semi-Supervised Training of Destination Map for Call Handling Applications, which claims priority to U.S. patent application Ser. No. 11/800,106, filed 04 May 2007, entitled Semi-Supervised Training of Destination Map for Call Handling Applications, which claims priority to U.S. Provisional Patent Application Ser. No. 60/920,234, filed on 26 Mar. 2007, entitled Semi-Supervised Training of Destination Map for Call Handling Applications.

FIELD OF THE INVENTION

The present invention pertains to systems that employ automatic speech recognition. More particularly, the present invention relates to the development of destination maps for call handling applications, such as automated directory assistance and call steering.

BACKGROUND OF THE INVENTION

Automatic speech recognition technology has undergone rapid advancement in recent years and is finding widespread use in many different applications. One application in which automatic speech recognition is of particular interest is "call handling". Two examples of call handling applications are automated directory assistance and call steering (or call routing). Automated directory assistance and call steering functions are being used by businesses more and more commonly to handle incoming telephone calls. An automated directory assistance application may receive a spoken request from a telephone caller for a "destination", such as a telephone listing (telephone number), recognize the caller's speech to identify the requested destination, and provide the requested information to the caller using recorded or synthesized speech.

Such a system might be implemented, for example, in a call center associated with a public switched telephone network (PSTN). A call steering system may be similar, except that it can automatically route a call to a spoken destination, rather than merely responding with information. For example, a call steering system can be used to connect a conventional telephone call, or to route a caller through a hierarchical structure of voice-responsive content, such as a "voice web". Of course, automated directory assistance and call steering functions may also be combined in a given system.

Call steering and directory assistance applications both operate generally by mapping an incoming utterance (request) to one of many possible destinations. The mapping between the incoming utterance and the desired destination is established by a combination of a speech recognition engine and a mapping engine. The speech recognition engine uses a language model to recognize a caller's speech. The language model may be a speech recognition grammar, for example, which is a data representation of the usable vocabulary and syntax for the set of destinations. As another example, the language model may be a statistical language model. A statistical language model typically includes a larger vocabulary than a grammar but does not include syntax information. Rather than requiring specific word strings to be detected for recognition, a statistical language model includes probabilities of occurrence for each possible sequence of words in the vocabulary. In general, the sequence of words with the highest probability for a particular input is taken as the recognition result.

The mapping engine maps an input string of words output by the speech recognizer to one of many possible destinations. A mapping engine may use a grammar that specifies all possible word strings for each destination. Alternatively, the destination map may be statistical in nature. Creating an appropriate destination map for an automated directory assistance or call steering application can be tedious work. One has to consider as many ways as possible that any given destination may be referred to by a caller. This process tends to be labor-intensive and time-consuming, adding to the overall cost of the system.

SUMMARY OF THE INVENTION

One aspect of the present invention is a method which comprises examining caller interaction results from a call handling system that includes an automated call handling engine, detecting a specified characteristic in the caller interaction results, and using the detected characteristic to automatically train a destination map, which is for use by the automated call handling engine in automatically mapping human speech to a destination.

Another aspect of the present invention is a method which comprises examining caller-operator interactions in a call handling system which includes an automated call handling engine, where the caller-operator interactions correspond to a particular speech recognition string produced by an automatic speech recognizer, and where the particular recognition string represents speech from one or more callers. The method further includes automatically creating a disambiguation dialog for the speech recognition string, based on the caller-operator interactions.

The present invention further includes an apparatus to perform each of the above-mentioned methods.

Other aspects of the invention will be apparent from the accompanying figures and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
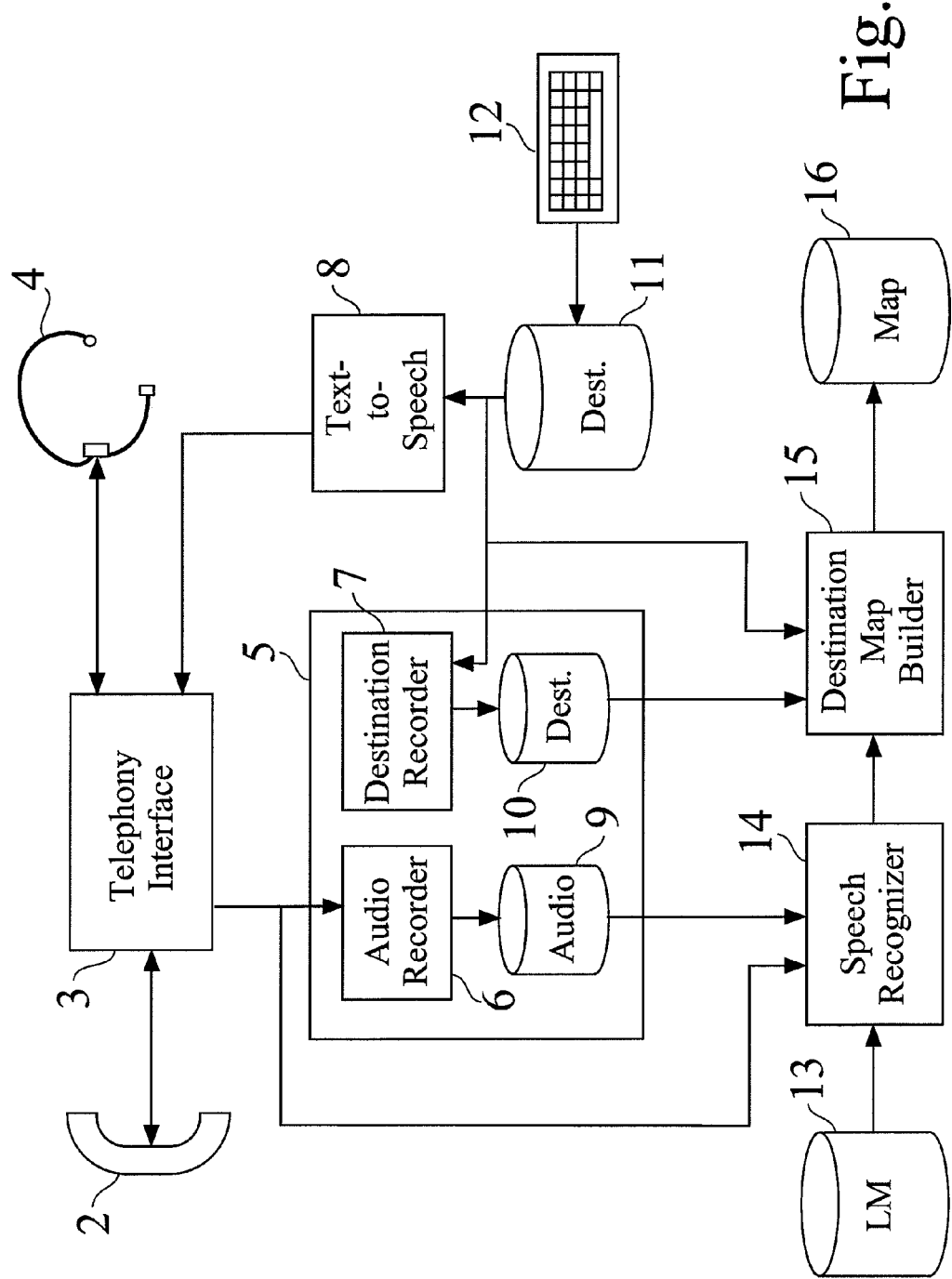
FIG. 1 illustrates a system for automatically developing destination maps for a call handling application.

Before releasing a destination to a caller, a call handling system of the type described herein asks the caller whether the destination it found based on the caller's request is correct. If the system has low confidence with its listing hypothesis, or if the caller responds negatively to confirmation, then the call is redirected to an operator, who is assumed to be efficient in his interaction with the caller. As a result, one can have confidence that the final released destination reflects the desired destination with reasonable accuracy. This characteristic of call handling data permits accuracy evaluation with no further transcription or supervision of the data.

Hence, as described in greater detail below, a destination map for automated call handling can be constructed based on multiple telephone calls to a call handling system. The destination map may include one or more grammars, statistical destination maps (e.g., a statistical semantic model), or a combination thereof. For each call, speech from the caller is recorded in the system during a dialog between the caller and a human operator. The speech represents a request by the caller for a destination. Also recorded in the system is destination identifying information specified by user input from the operator in response to the request. An automatic speech recognizer may be used to recognize the speech from the caller. The recorded speech and the recorded destination identifying information can be used to automatically build the destination map. The destination map may then be used to automatically associate recognized speech from a subsequent caller with a corresponding destination, either in the same call handling system or in a different call handling system.

In this description, the term "destination" can mean, for example, a telephone listing (telephone number), an address, a name, a part of an organization, a topic or category of information, or any other type of entity or information which a caller may wish to contact or otherwise access.

Also described further below is a method of semi-supervised synonym inference, for automatic training of a destination map. The method involves the automatic training of a destination map based entirely on results of operation of the call handling system. In one embodiment the method comprises examining a database of caller interaction results from the system, detecting a specified characteristic in the caller interaction results, and using the detected characteristic to automatically train the destination map.

The caller interaction results can include a database of operator-selected destinations that correspond to a particular speech recognition string output by an automatic speech recognizer, representing a caller's request, for multiple instances in which a caller rejected the recognition string as incorrect or the system was unable to recognize the caller's speech. Detecting the specified characteristic in that case can include performing a statistical analysis of the caller interaction results. In particular, if callers were consistently routed to a particular operator-selected destination in such instances, then that destination can be assumed to be the correct destination for the recognition string in question. Accordingly, in such instances, the destination map can be trained to map that recognition string to that destination. If, on the other hand, there is no destination to which callers were consistently routed by an operator for that recognition string, then the system can be trained to route subsequent callers immediately to an operator whenever that recognition string is detected in the caller's speech. If the caller interaction results indicate that the recognition string was transferred to a relatively small number of destinations with consistency (but more than one), then the secondary interactions between the callers and the system can be monitored, from which the correct question(s) can be inferred to ask of subsequent callers in order to disambiguate between the candidate destinations.

Eventually, all of the most frequently occurring interactions are automatically inferred from the behavior of operators. The operators are left with the "interesting" interactions, and the system automatically handles the common ones.

Note that in this description, references to "one embodiment" or "an embodiment" mean that the feature being referred to is included in at least one embodiment of the present invention. Further, separate references to "one embodiment" in this description do not necessarily refer to the same embodiment, however, neither are such embodiments mutually exclusive.

Automatic Creation of Destination Map

A system for automatically developing a speaker-independent destination map for a call handling application may be implemented in an otherwise conventional call center, such as a call center used for telephone directory assistance. It should be noted, however, that while the techniques described herein are directed to handling telephone calls (e.g., directory assistance, call steering, etc.), these techniques are not necessarily restricted to telephony based applications. That is, these techniques can be applied to any communications application in which live speech from a user is automatically recognized to automatically direct or respond to the user.

In general, the process of a conventional directory assistance inquiry may be as follows. A telephone caller remote from the call center requires information, such as the telephone number of a person or entity, the name of which the caller knows. Accordingly, the caller dials the directory assistance phone number to establish a telephone connection with a human operator in the call center, via a public switched telephone network (PSTN). The caller speaks a request, for example, by saying the city and the name of the person whose phone number is needed. In response, the operator accesses a database of phone numbers using a computer system. The phone numbers may be indexed by name, address, and/or various other information, and displayed on a conventional computer display device. The operator manually enters an input into the computer system using a keyboard, pointing device, touch-sensitive screen or other conventional input device, to select the requested phone number. In response to the operator input, the phone number is output to the caller over the telephone connection using recorded or synthesized speech.

Consider next an example of a conventional call steering process. A caller may state a desired service or information (such as help for servicing a VCR). The operator in a call center, upon hearing the caller's spoken request, routes the call to the appropriate destination (such as the electronics department of a business).

FIG. 1 illustrates a system for automatically developing destination maps for automated call handling. The illustrated system may be implemented in a call center of the type mentioned above. The techniques described herein provide (among other things) that the spoken request of the caller and the input of the operator are captured and associated with each other, to automatically create or train a destination map for an automated call handling application. The destination map that is generated may be used in the same system which generates it or in a different system. The illustrated system includes a conventional telephony interface 3 providing a telephone connection between a remote caller using a telephone input/output (I/O) device 2 (e.g., a handset, headset, or the like) and a directory assistance operator using another telephone I/O device 4 (shown as a headset). In the illustrated embodiment, speech from the caller is routed by the telephony interface 3 to a recording subsystem 5, which acquires data from which the destination map is constructed. The recording subsystem 5 is optional, however, as explained below, as the destination map can also be generated in real-time. The recording subsystem 5 includes an audio recorder 6 and a destination recorder 7. The audio recorder 6 stores the speech of the caller as audio in an audio database 9. The audio recorder 6 may be implemented using any conventional techniques and equipment for performing such an operation.

The operator may respond to the spoken request of the caller by locating the requested destination on the computer system and selecting it with an appropriate user input from a conventional user input device 12 (shown in FIG. 1 as a keyboard). For example, the operator may see a list of displayed destination identifiers, such as names and telephone numbers, which are stored in a destination database 11 (which may be, for example, a telephone listings database). The user may enter an input using, for example, a keyboard, mouse or touch-sensitive display to select the appropriate one of the entries or to alphanumerically type the destination. The selected entry is then passed from the destination database 11 to a text to speech converter 8, which outputs the selected destination to the caller as recorded or synthesized speech via the telephony interface 3. Note that the text-to-speech converter 8 is optional; the operator may simply speak the selected destination to the caller or transfer the caller to the destination.

When the operator enters the input to specify a destination identifier using the input device 12, the destination recorder 7 records the specified destination in another destination database 10. The destination recorder 7 may be implemented with any conventional techniques and equipment for capturing data specified by a user input. The contents of the audio database 9 and destination database 10 are used to generate a speaker-independent destination map 16 for enabling automated call handling. When deployed in an automated call handling system, a mapping engine (not shown) uses the destination map to map recognized speech from a caller to appropriately route and/or respond to the call. The destination map 16 generated by the present system may be, for example, a grammar, statistical destination map (e.g., a statistical semantic model such as a classification and regression tree (CART), latent semantic indexing or artificial neural network (ANN)), or any other structure usable for the same purpose. The precise format of the destination map 16 is unimportant for understanding the present technique and can vary from one embodiment to another; any of a variety of formats may be used. What is important is that the destination map 16 includes an association between destinations and recognition strings (word strings) from automatically recognized speech.

Accordingly, the illustrated system also includes an automatic speech recognizer 14 and a destination map builder 15. The speech recognizer 14 may be a conventional speech recognition engine. Note that the speech recognizer 14 is not used for automated call handling in the system of FIG. 1, but is instead used to generate a destination map that will be used by an automated call handling system, i.e., a call handling system that uses automatic speech recognition. In alternative embodiments, however, the same speech recognizer can be used both in the process of generating destination maps and in the process of using such destination maps in automated call handling, as described below. The speech recognizer 14 receives as input the recorded speech of one or more callers from audio database 9 and outputs recognized speech to the destination map builder 15 based on such input. The destination map builder 15 generates the destination map 16 for enabling automated call handling, by creating associations between the recognized speech and the selected destination for each call.

Note that the speech recognizer 14 and/or the grammar builder 15 may be omitted or bypassed in certain embodiments, such that their functions are performed manually. For example, the recorded speech can be played back to, and transcribed by, a person. This person may also manually create the associations between the recognized speech and the recorded destinations.

To recognize recorded speech of callers, the speech recognizer 14 accesses a language model 13. The language model 13 used by the speech recognizer 14 may be one or more speech recognition grammars and/or statistical language models. The speech recognizer 14 may also use one or more dictionary models and/or acoustic models (not shown) as input.

The system of FIG. 1 may create or train the destination map 16 in either a real-time mode or a non-real-time mode. In real-time mode, the destination map 16 is created and/or trained "on the fly". In that case, the recording subsystem 5 may be bypassed or omitted, such that speech from the caller is routed directly from the telephony interface 3 to the speech recognizer 14, and corresponding destinations specified by the operator are provided directly from destination database 11 to the destination map builder 15. In non-real-time mode, the recording subsystem 5 is employed, such that the destination map 16 need not be created or trained while incoming calls are being processed by the call center. In this case, the recording subsystem 5 stores the recorded audio and destinations in such a manner as to enable the destination map builder 15 to identify related speech and destinations off-line, such as by time-stamping the recorded speech and destinations.

Figure 2:
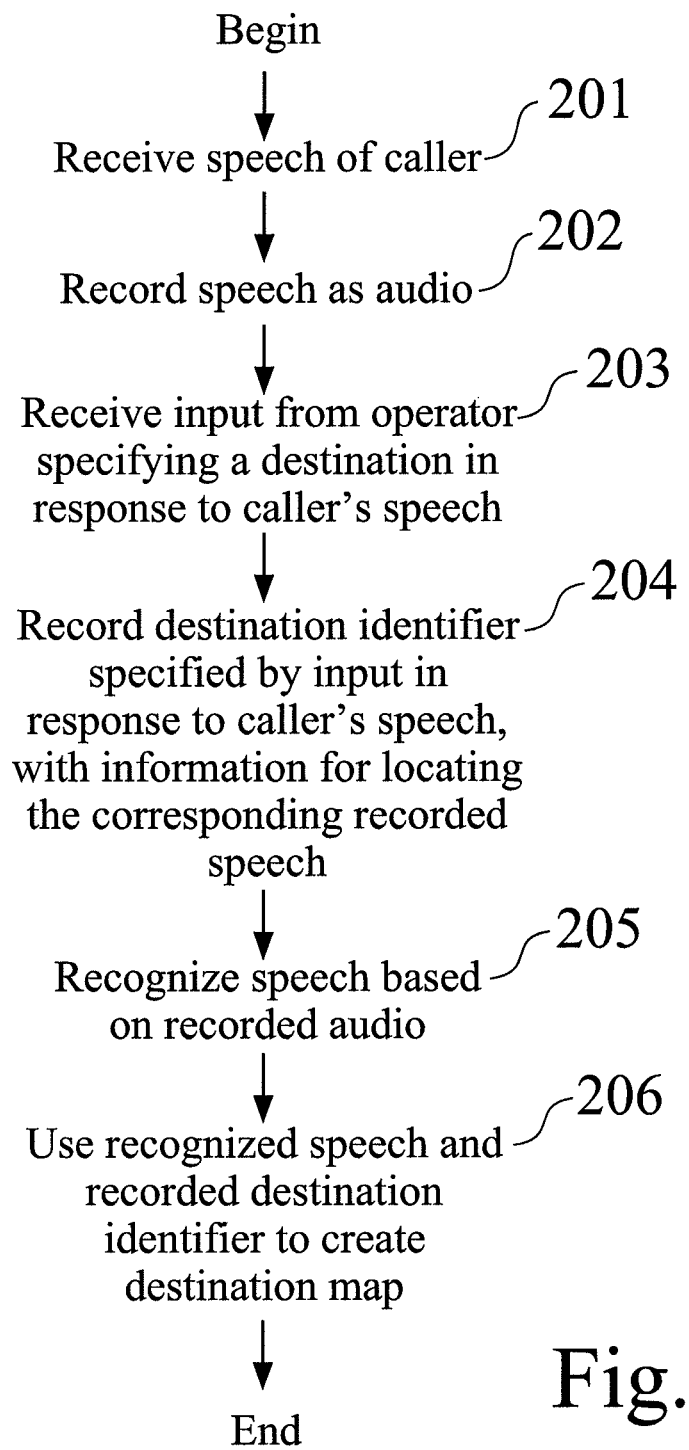
FIG. 2 is a flow diagram illustrating a process performed by the system of FIG. 1 to automatically create a destination map.

FIG. 2 shows a process that may be performed by the system of FIG. 1 to automatically create the destination map 16, according to one embodiment. The illustrated process corresponds to the non-real-time mode; however this process can be easily modified to implement the real-time mode, in a manner which will be apparent to those skilled in the art. The system initially receives speech from the caller at block 201 and then records the speech in the audio database 9 at block 202. As noted, the speech may be recorded with timestamp information. At block 203, the system receives input from the operator specifying a destination identifier, where such input is responsive to the caller's speech. At block 204, the destination recorder 7 records the destination identifier specified by the operator's input, with a timestamp. The speech recognizer 14 recognizes the recorded audio at block 205, and at block 206, the destination map builder 15 uses the recognized speech and the recorded destination identifier to create and/or train the speaker-independent destination map 16. Note that many variations upon the foregoing process are possible. For example the order of operations may be altered and/or operations may be omitted and/or added to better suit a particular implementation.

The destination map 16 may take the form of one or more grammars. This may be accomplished by allocating a grammar for each possible destination and adding the exact word string of a caller's speech to the grammar of the associated destination. In this approach, the destination map builder 16 preferably avoids duplicating previously-added word strings to any given grammar. As an alternative to using grammars, the destination map 16 may be statistical. Conventional techniques may be employed for this purpose. A separate statistical destination map may be created for each destination. Ways in which such statistical destination maps can be used for automated call handling are discussed further below.

Figure 3:
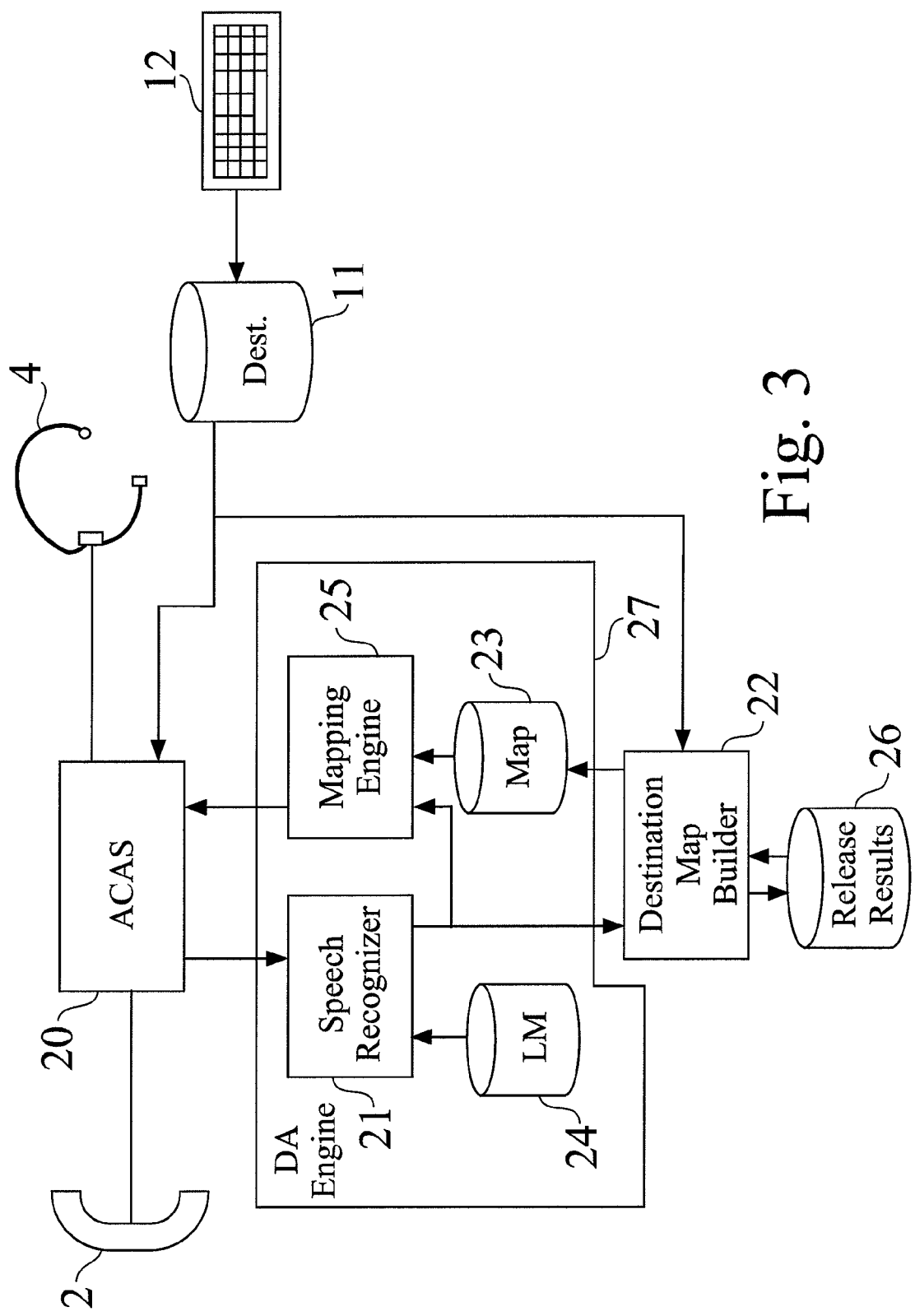
FIG. 3 illustrates an automated directory assistance call center configured to automatically train a destination map used in directory assistance.

FIG. 3 illustrates an automated directory assistance call center configured to automatically train a destination map in a directory assistance application. In the system of FIG. 3, the same speech recognizer is used both in generating a destination map and in using the destination map in automated call handling. The system includes an automated call answering system (ACAS) 20, which includes a telephony interface (not shown), and which automatically answers and handles calls to the call center. A call is connected to a human operator only if the caller requests human assistance or if a speech recognition error occurs. The system further includes an automated directory assistance (DA) engine 27. The DA engine 27 includes an automatic speech recognizer 21, a mapping engine 25, a language model 24 and a speaker-independent destination map 23.

Hence, upon answering an incoming call, the ACAS 20 routes speech from the caller to the speech recognizer 21. The speech recognizer 21 uses the language model 24 as input to recognize the caller's speech, producing a recognition string as output. The mapping engine 25 identifies a destination requested by the caller based on the recognition string and the destination map 23. If the mapping engine 25 is able to identify a destination corresponding to the recognized speech, then the mapping engine 25 outputs the recognized destination to the ACAS 20. The ACAS 20 then outputs the destination to the caller as recorded or synthesized speech. The ACAS 20 includes a text-to-speech converter (not shown) for this purpose.

If the mapping engine 25 is unable to identify a destination for the recognized speech, however, the mapping engine 25 signals this condition to the ACAS 20. In response, the ACAS 20 routes the call to a human operator of telephone I/O equipment 4. The caller then repeats the request to the operator, or, if the caller's speech has been recorded, the recording of the caller's request may instead be played back to the operator. In either case, the operator responds by inputting a destination selection to destination database 11 as described above. The destination selection is then returned to the ACAS 20 and output to the caller as recorded or synthesized speech. In addition, the operator's input is used to train the destination map 23. Specifically, the destination output from database 11 in response to the operator's input is applied to the destination map builder 22, which also receives the recognized speech from the speech recognizer 21. The destination map builder 22 then trains (updates) the destination map 23 based on this input. The destination map builder 22 in this embodiment can operate in the same manner as the destination map 15 described above.

For instances in which the system fails to correctly recognize the caller's request such that the call is routed to an operator, the destination map builder 22 also stores the (apparently incorrect) output string of the speech recognizer 21 and the operator-selected destination in association with each other in a caller interaction results database (also called "release results database") 26. The contents of the release results database 26 can then be used by the destination map builder 22 or another entity to perform additional, semi-supervised training of the destination map 23, as described further below.

The system of FIG. 3 optionally may also include a recording subsystem (not shown) such as in the system of FIG. 1, to enable training of the destination map 23 in a non-real-time mode.

Figure 4:
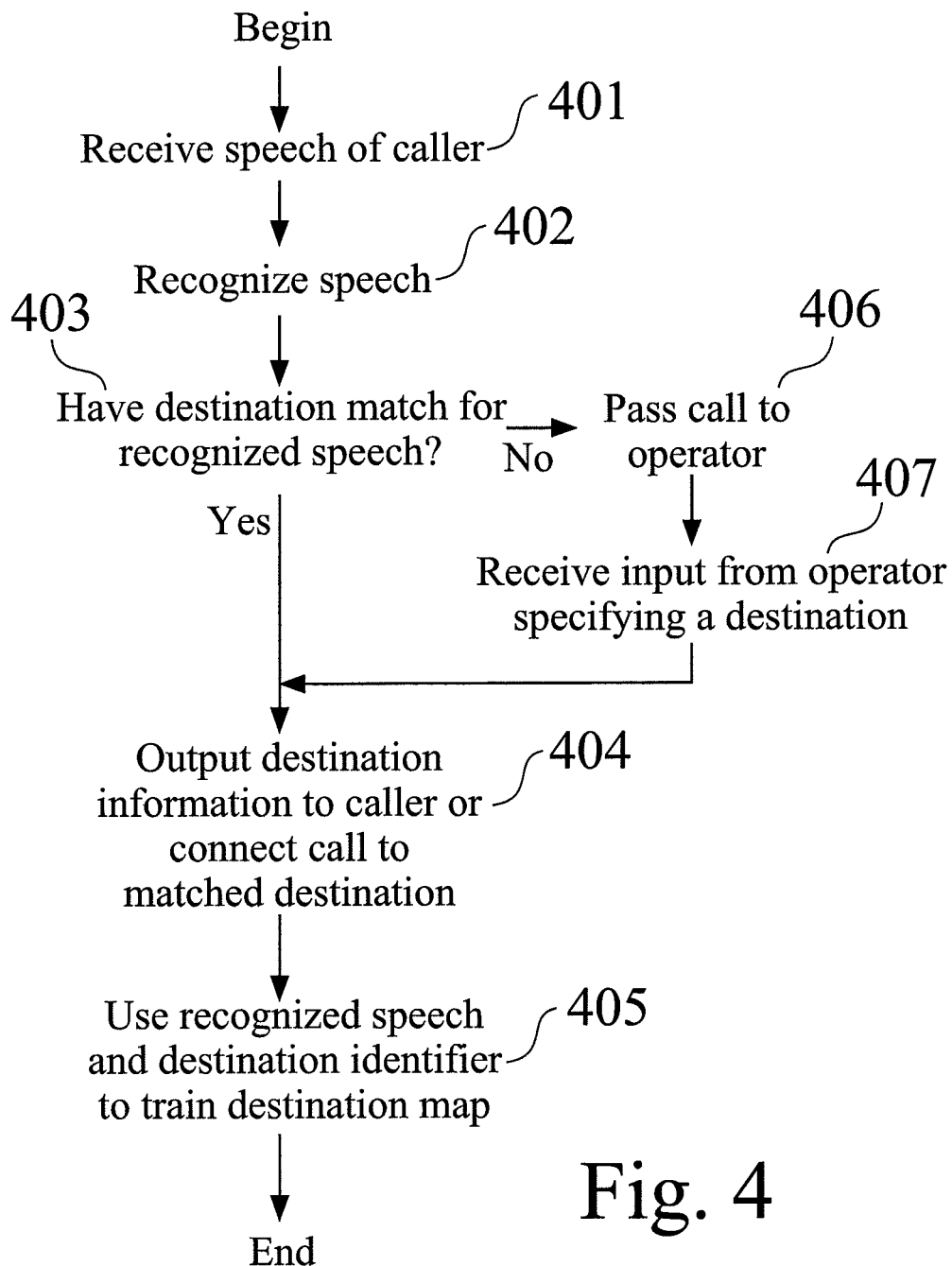
FIG. 4 is a flow diagram illustrating a process performed by the system of FIG. 3 to automatically train a destination map used in directory assistance.

FIG. 4 illustrates a process that may be performed by the system of FIG. 3 to create or train a destination map in real-time for automated call handling. At block 401, the ACAS 20 receives speech from a caller. The speech recognizer 21 recognizes input speech at block 402, and at block 403 it is determined whether there is a destination match for the speech. If so, then at block 404, the destination information is output to the caller. Alternatively, the caller may simply be connected to the destination. At block 405, the recognized speech and destination are used by the destination map builder 22 to train the speaker-independent destination map 23. If no destination match is found at block 403, then at block 406 the call is passed to the operator. In that case, input from the operator is received at block 407 specifying a destination, and the process proceeds as described above from block 404.

Figure 5:
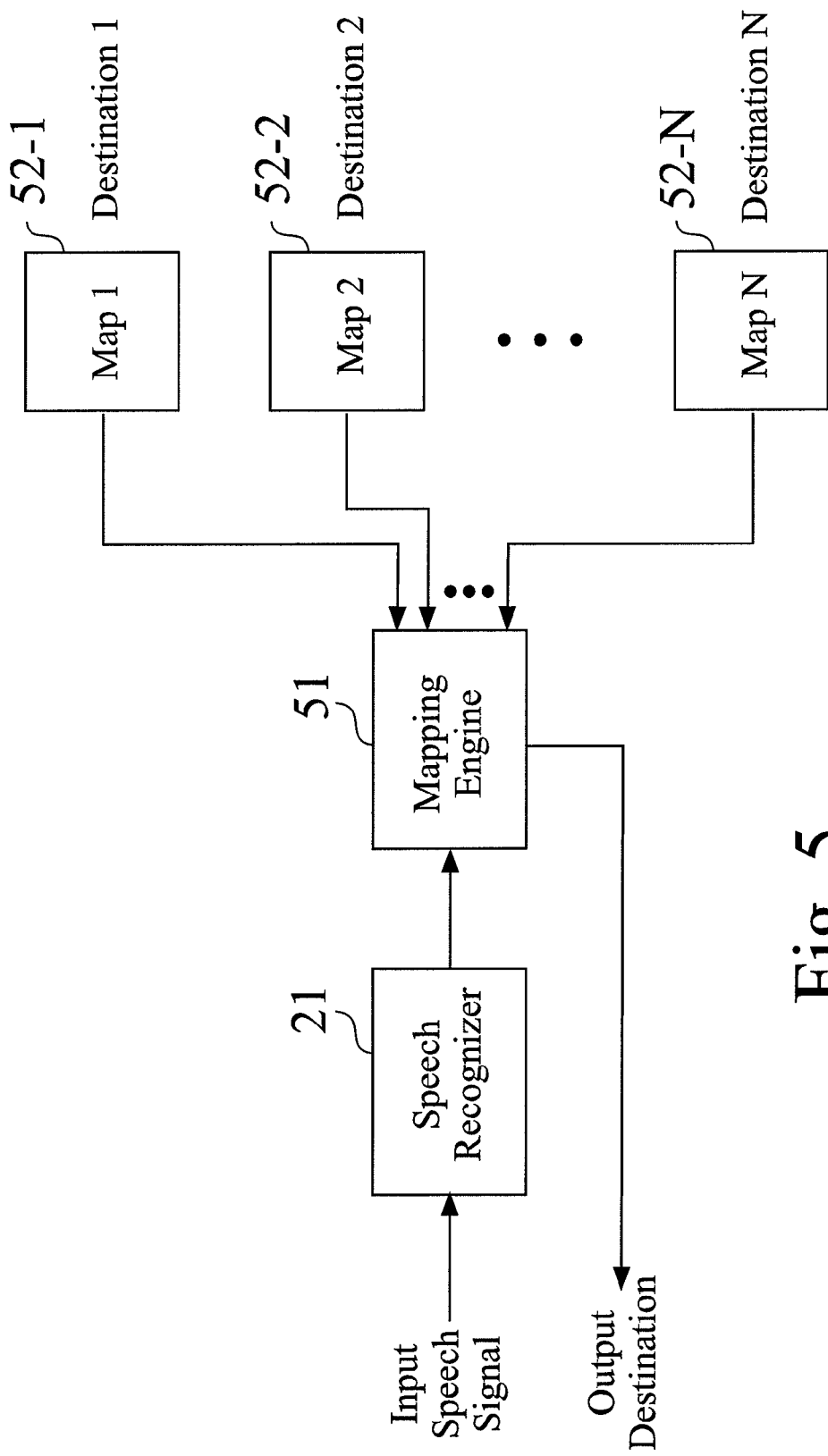
FIG. 5 shows a speech recognizer and a destination mapping engine coupled to a set of destination maps.

As noted above, it may be desirable to generate the destination map in the form of a statistical destination map, such that a separate statistical destination map is generated for each possible destination. This approach is illustrated in FIG. 5, in which N speaker-independent destination maps 52-1 through 52-N correspond to N destinations 1 through N, respectively. When handling an incoming call, the mapping engine 51 scores the recognized speech from the recognizer 21 against each statistical destination map 52. The destination corresponding to the destination map 52 with the highest score is selected and output by the mapping engine 51 as the result. The statistical destination map for each destination may be, for example, a statistical language model trained on utterances corresponding to that destination.

Figure 6:
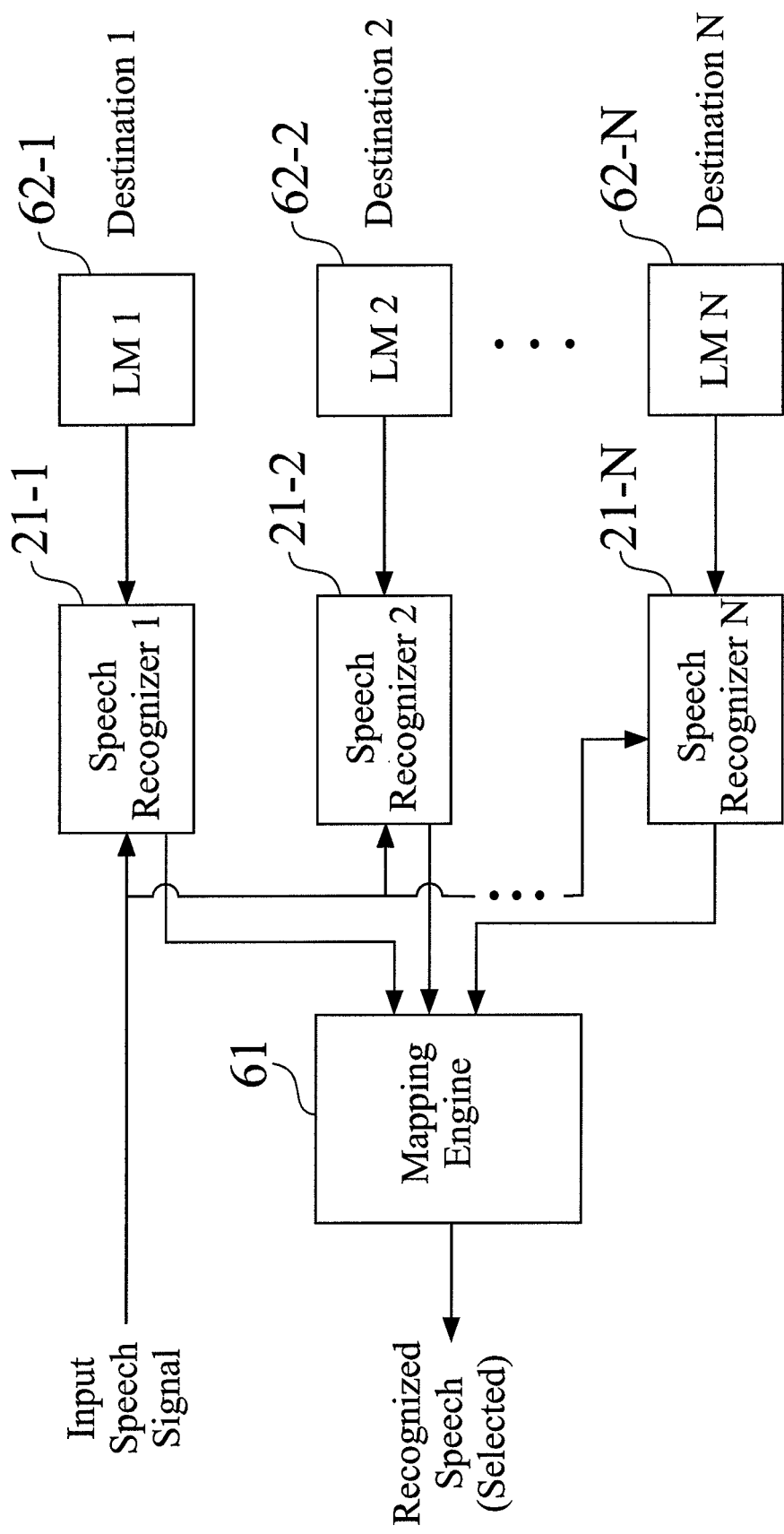
FIG. 6 shows a destination mapping engine and a set of N speech recognizers.

Another approach is illustrated in FIG. 6. In FIG. 6, N speech recognizers 21-1 through 21-N using N language models 62-1 through 62-N, respectively, operate in parallel. A separate recognizer 21 is associated with each language model 62, and there is a separate language 62 model for each destination. Each language model 62 is assumed to be trained using data from its corresponding destination. The output of the recognizer 21 representing the highest score is selected as the recognition result by the mapping engine 61. As yet another alternative, a single language model database may contain N statistical language models in parallel.

Some or all of the components and techniques mentioned above may be implemented in a conventional computer system, or in multiple computer systems connected on a network. Within such a computer system or systems, some or all of these components or techniques may be implemented in software, either in whole or in part. For example, the speech recognizer and destination map builder, among others, may be well-suited to implementation in software. Nonetheless, the techniques described herein are not restricted to any particular combination of hardware and/or software.

Training Destination Map Using Semi-Supervised Synonym Inference

As noted above, because an operator is assumed to be efficient in his interaction with the caller, one can have confidence that the final released destination reflects the desired destination with reasonable accuracy. This characteristic of call handling data permits accuracy evaluation with no further transcription or supervision of the data.

Referring again to FIG. 3, a destination map 23 for automated directory assistance or for a call routing system can be constructed directly from the destination database 11, where variation and listing weighting are coarsely determined by observed frequencies. This methodology can be modified in the presence of release-number-tagged data, such that the recognition strings output from the speech recognizer 21 can be used as auxiliary training material for the destination map 23.

At least two methods can be used, separately or together, to augment training of the destination map 23. These two methods complement each other to a degree. As a result, they will be discussed in the correct order of application under the labels "first stage" and "second stage", respectively. The first stage synonym learning method is essentially a heuristic weighting scheme to convert the frequencies of the observed word-string/release-number pairs into weights in the same dynamic range as the weights applied to the canonical training material. The canonical training material is derived, for example, directly from the directory assistance listings database, and there is typically no indication in this database of which listings are more common than others. As a result, the canonical statistical semantic model training would be unweighted across listings. On the other hand, the observed word-string/release-number pairs will embody the call distribution. Therefore, a mechanism is needed to make these two training mechanisms cooperate. This mechanism can be provided by weighting the observations with $1-\exp(-n/N)$, where $N=10$, for example. The result is that infrequent word-string/release-number pairs are weighted very low, while any pair with observation frequency n larger than N will receive a weighting close to one (1). Note that the distribution (i.e., prior probabilities of the release-numbers) is also assumed to be trained into the overall system, but at the level of interest the mechanism provided compresses them for compatibility with the canonical training mechanism.

The second stage includes consideration of the errors remaining in the training set, i.e., the caller interaction results database ("release results database") 26. This method can be implemented in the form of a look-up table, operating in preference to (or as a high-priority subset of) the destination map 23. If a filtered recognition string matches a key in this table, the returned listing is taken from the table. Otherwise, it is sent to the destination map 23 for interpretation. The filtering includes the relatively modest removal of disfluencies and extraneous prefix and suffix words (e.g., "um", "I need the number for", "please").

After filtering, two statistics are measured for each frequent filtered recognition string. First, the probability of error, $p(\epsilon|s)$, is estimated as the proportion of calls including the filtered recognition string, s, that resulted in an automatically selected destination which did not match the operator-selected destination. Second, the consistency of these errors is estimated: that is, the error consistency, $p(c|s, \epsilon)$, is computed as the proportion of calls from the afore-mentioned set that were sent to the most frequently (operator-) selected destination. Note that instances in which the system was unable to recognize the caller's speech may be treated the same as instances in which the caller rejected the offered recognition result, i.e., both may be treated as an instance of "error" (incorrect recognition) for purposes of computing $p(c|s, \epsilon)$ and $p(\epsilon|s)$.

If the (estimated) probability of a consistent incorrect recognition is greater than the probability of a correct recognition for a given recognition string, then it is clear that a hard mapping of that recognition string to an alternate (operator-selected) destination would be beneficial. In other words, if the gain condition $p(c|s, \epsilon)*p(\epsilon|s)>1-p(\epsilon|s)$ is true, then a hard mapping of s to an alternate destination is of value.

However, if the consistency is poor for incorrect recognitions of the filtered recognition string s, i.e., if the ratio of potential gain to loss, $p(c|s, \epsilon)*p(\epsilon|s)/1-p(c|s, \epsilon)*p(\epsilon|s)$, is less than the slope of the receiver operating characteristic (ROC) at the operating point of the overall system, then it is beneficial for the mapping engine 25 to reject calls represented by that recognition string outright, i.e., to route all calls in which this recognition string occurs immediately to an operator. Similarly, there may also be benefit in rejecting calls for which the gain condition is not met, but the observed gain to loss ratio, $1-p(\epsilon|s)/p(\epsilon|s)$, is smaller than the slope of the ROC at the operating point of the overall system.

Application of the second stage training mechanism can be applied on its own, or subsequent to the first stage mechanism of training. In the latter case, the training material needs to be processed by the destination map resulting from the first stage before statistics for the second stage are derived.

Figure 7:
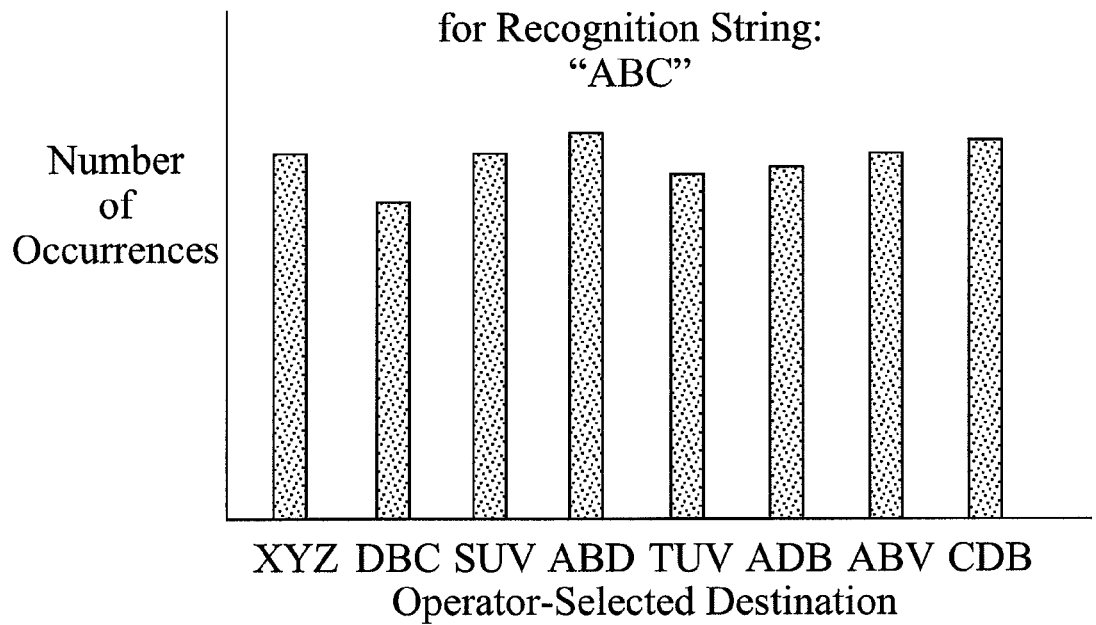
FIG. 7 shows a first example of a histogram of operator-selected destinations for a particular speech recognition string.

This technique is illustrated further now with reference to FIGS. 7 through 10. FIG. 7 shows an example of a histogram of operator-selected destinations for a simple speech recognition string, "ABC". In reality, the recognition string may be more complex. The histogram shows the number of times which each of a number of different destinations was selected by a human operator, for instances in which the speech recognizer 21 incorrectly determined that the caller requested "ABC" (e.g., the destination "ABC" was rejected by the caller). Hence, the ratio of the number of calls represented in FIG. 7 to the total number of calls represented in the release results database 26 that correspond to recognition string "ABC" is the probability of error, $p(\epsilon|s)$. It can be seen that the distribution among destinations in FIG. 7 is relatively flat. This means that the gain condition $p(c|s, \epsilon)*p(\epsilon|s)>1-p(\epsilon|s)$ is false for this example. In other words, FIG. 7 indicates that instances in which the system incorrectly detected the string "ABC" from the caller's speech were not consistently routed by an operator to any one destination. As such, it would not be beneficial to hard-map recognition string "ABC" to an operator selected destination.

Figure 8:
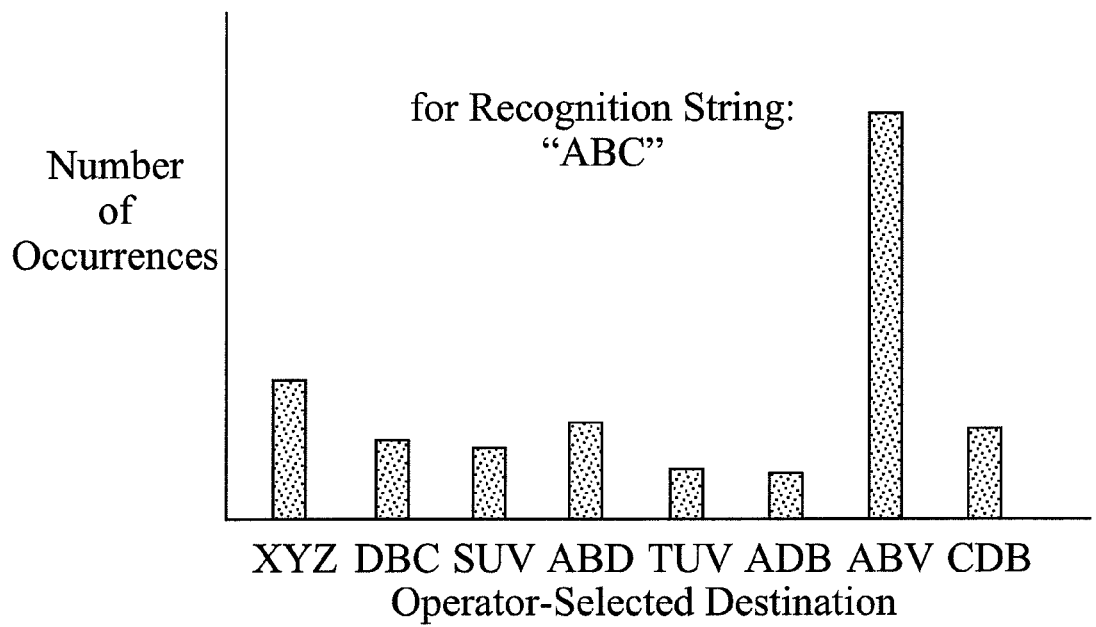
FIG. 8 shows a second example of a histogram of operator-selected destinations for the particular speech recognition string.

FIG. 8 shows another example of a histogram for the same recognition string, "ABC". In this case, the distribution is highly highly-skewed toward actual destination ABV. FIG. 8 indicates, therefore, that most of the instances in which the system incorrectly detected the string "ABC" from the caller's speech were consistently routed by an operator to destination ABV. In other words, the gain condition $p(c|s, \epsilon)*p(\epsilon|s)>1-p(\epsilon|s)$ is true for this example, because destination ABV is represented disproportionately higher than other destinations in the distribution. As such, it would be beneficial in this example to train the destination map 23 by hard-mapping recognition string "ABC" to destination ABV.

Figure 9:
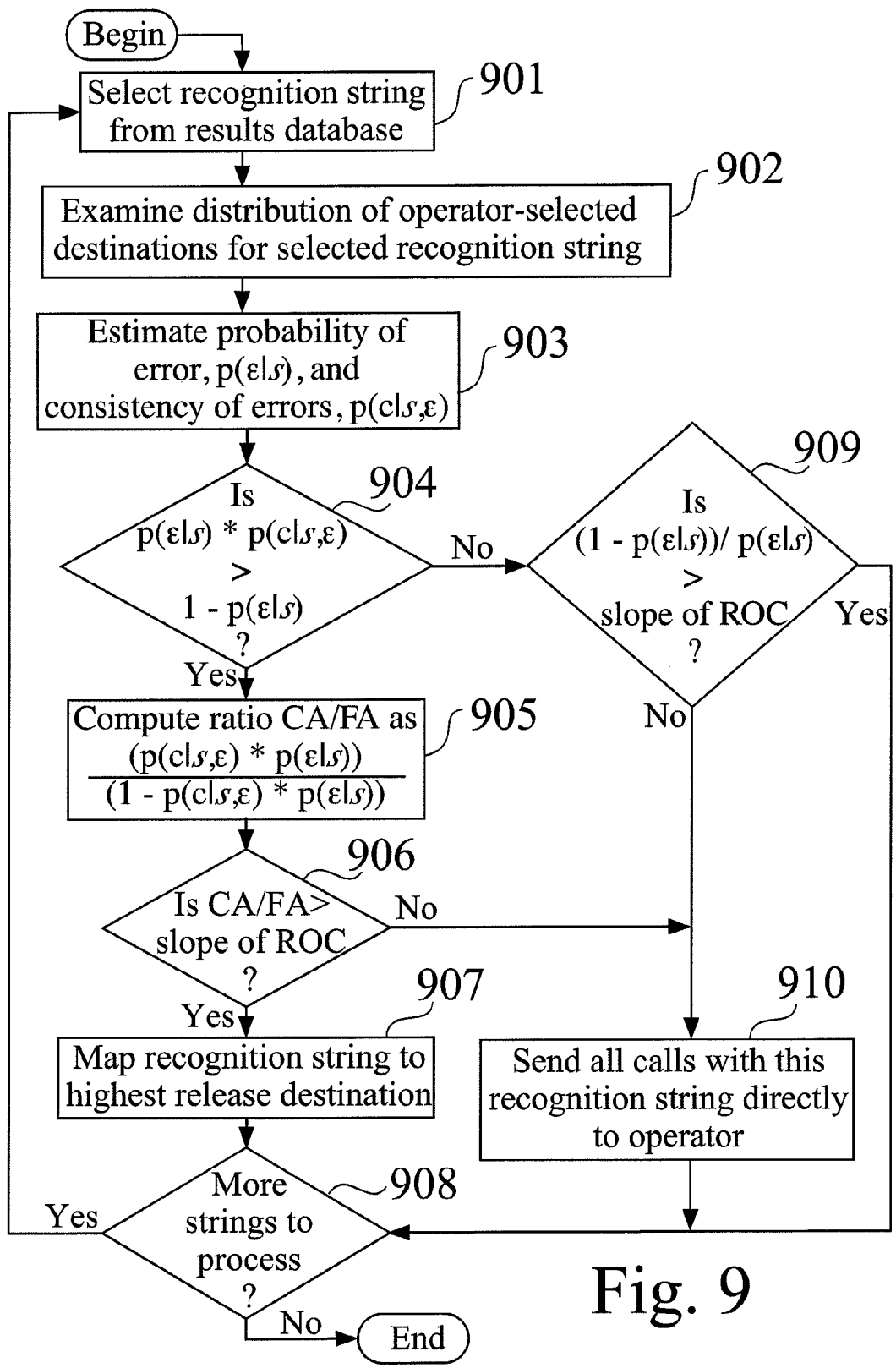
FIG. 9 is a flow diagram illustrating a process of semi-supervised synonym inference for automatically training a destination map.

FIG. 9 shows an example of the above-described process of semi-supervised synonym inference for automatically training a destination map. The process may be performed by, for example, the destination map builder 22 (FIG. 3) or by some other processing device or entity, hereinafter generically referred to as "the processing logic". Initially, at block 901 the processing logic selects a recognition string, s, from the release results database 26 (the contents of which represent instances of recognition errors). The processing logic then examines the distribution of operator-selected destinations for the selected recognition string, s, at block 902. Examples of such distributions are shown in FIGS. 7 and 8. The processing logic then estimates at block 903 the probability of error, $p(\epsilon|s)$, and consistency of errors, $p(c|s,\epsilon)$ for the recognition string, s.

Figure 10:
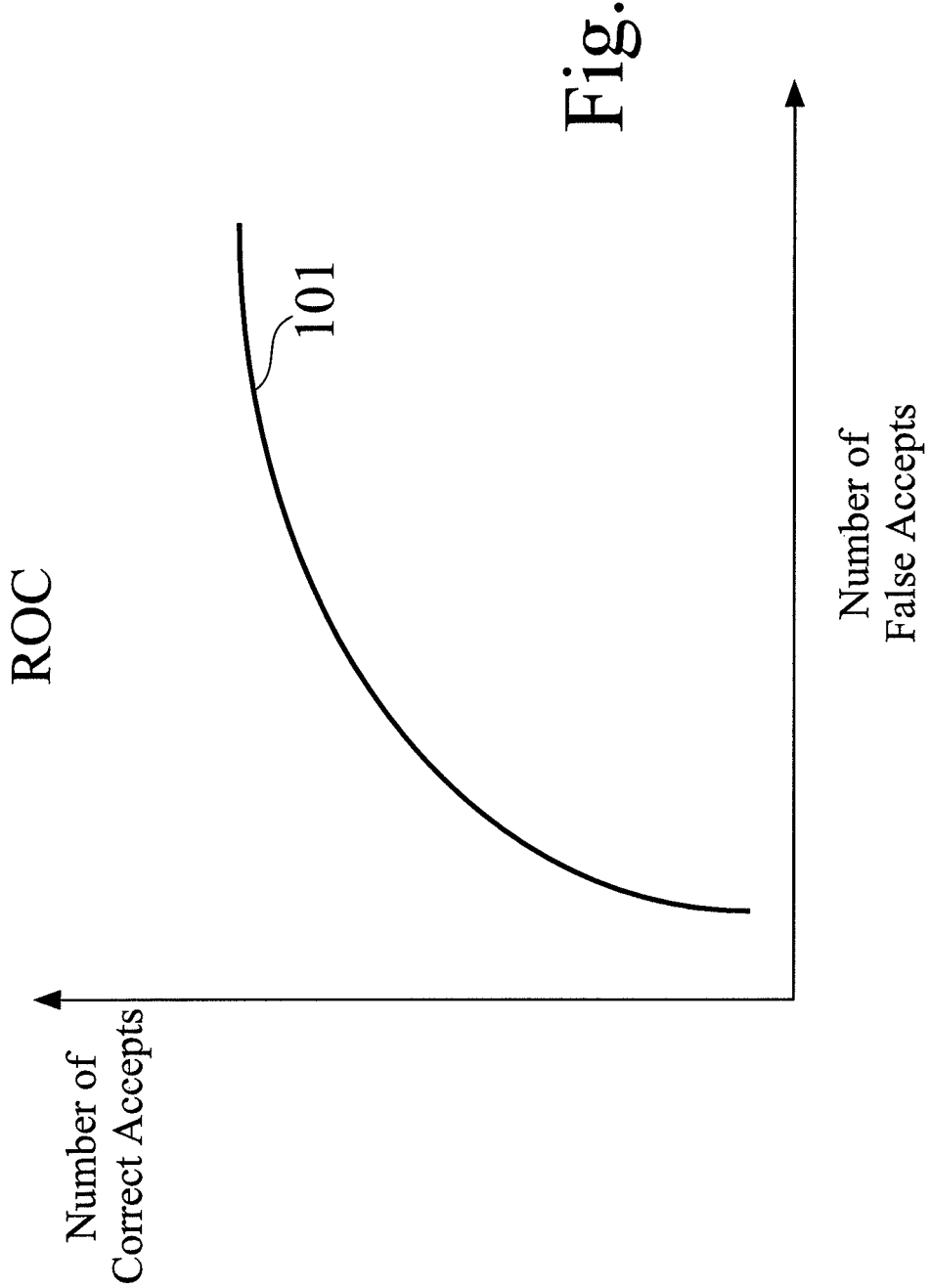
FIG. 10 illustrates an example of a receiver operating characteristic (ROC) curve.

The processing logic then determines whether $p(c|s)*p(c|s,\epsilon) > 1 - p(\epsilon|s)$ at block 904. If the processing logic determines that $p(\epsilon|s)*p(c|s,\epsilon) > 1 - p(\epsilon|s)$ at block 904, then at block 905 the processing logic computes the ratio of correct acceptance (CA) to false acceptance (FA) as $(p(c|s,\epsilon)*p(\epsilon|s))/(1-p(\epsilon|s,c)*p(c|s))$. Next, at block 906 the processing logic determines whether that ratio, CA/FA, is greater than the slope of the ROC at the operating point of the overall call handling system. FIG. 10 illustrates an example of an ROC curve 101 for a call handling system such as described above. If the outcome of block 906 is affirmative, then the processing logic trains the destination map 23 at block 907 to map the recognition string, s, to the highest release destination, i.e., the most frequently (operator-) selected destination for that recognition string, s, in the release results database 26. In that event, if there are more recognition strings to process in the release results database 26 (block 908), the process loops back to block 901 with the selection of another recognition string. If all recognition strings have been processed, the process ends.

If the outcome of block 906 is negative (i.e., if the ratio, CA/FA, is not greater than the slope of the ROC at the operating point of the overall call handling system), then the process branches to 910, where the processing logic determines that all future calls with this recognition string should be routed immediately to an operator. From block 910, the process proceeds to block 908, described above.

If the outcome of block 904 is negative (i.e., if $p(\epsilon|s)*p(c|s,\epsilon) \leq 1-p(\epsilon|s)$), then the process branches from block 904 to block 909, in which the processing logic determines whether the ratio, $(1-p(\epsilon|s))/p(\epsilon|s)$, is greater than the slope of the ROC at the operating point of the overall call handling system. If the outcome of block 909 is affirmative, then the process continues to block 908, described above. If, however, the outcome of block 909 is negative (i.e., if $(1-p(\epsilon|s))/p(\epsilon|s) \leq$ the slope of the ROC)), then the process continues to block 910, described above (i.e., the processing logic determines that all future calls with this recognition string should be routed immediately to an operator).

Note that many variations upon the above-described process are possible without altering its basic purpose or function. For example, in other embodiments, less than all of the above-described conditions might be checked in deciding whether to map a given recognition string to an operator selected destination (block 907) and/or in deciding whether to send all calls with a given recognition string to an operator (block 910). Similarly, other conditions might be checked in addition to or in alternative to those conditions described above (i.e., blocks 904, 906 and 909). Other variations on this process are also possible, such as in the order in which operations are performed, etc.

The above-described technique in general can also be extended and/or modified in various ways. For example, if the release results indicate that a particular recognition string was transferred frequently to a relatively small number of destinations with consistency, but more than one, then the secondary interactions between the callers and the system can be monitored, from which question(s) can be inferred for the system to automatically ask of subsequent callers to disambiguate between the candidate destinations. Suppose, for example, that two destinations, called "cellular billing" or "internet billing", are represented disproportionately higher than other destinations in the distribution. The system may observe that the recognition string "billing" gets sent primarily to these two destinations. By monitoring caller responses to the operator's disambiguation question, the system can correlate those responses to the two disambiguated destinations.

Following the example, therefore, the system might observe that when callers say "cellular" or "mobile", they are sent to the first destination, and when they say "internet" they are sent to the second destination. When the statistics provide sufficient confidence, the system can then guess at a number of possible disambiguation questions, such as, "Would you like [internet] or [cellular] billing?" or "Is that for your [internet] bill?" Now, the system could compare those candidate questions with the questions asked by the operators (that are also monitored). Thus, the system not only can automatically build a destination map, it can also automatically build a disambiguation dialog to use for subsequent callers, based entirely on observation of system performance.

Figure 11:
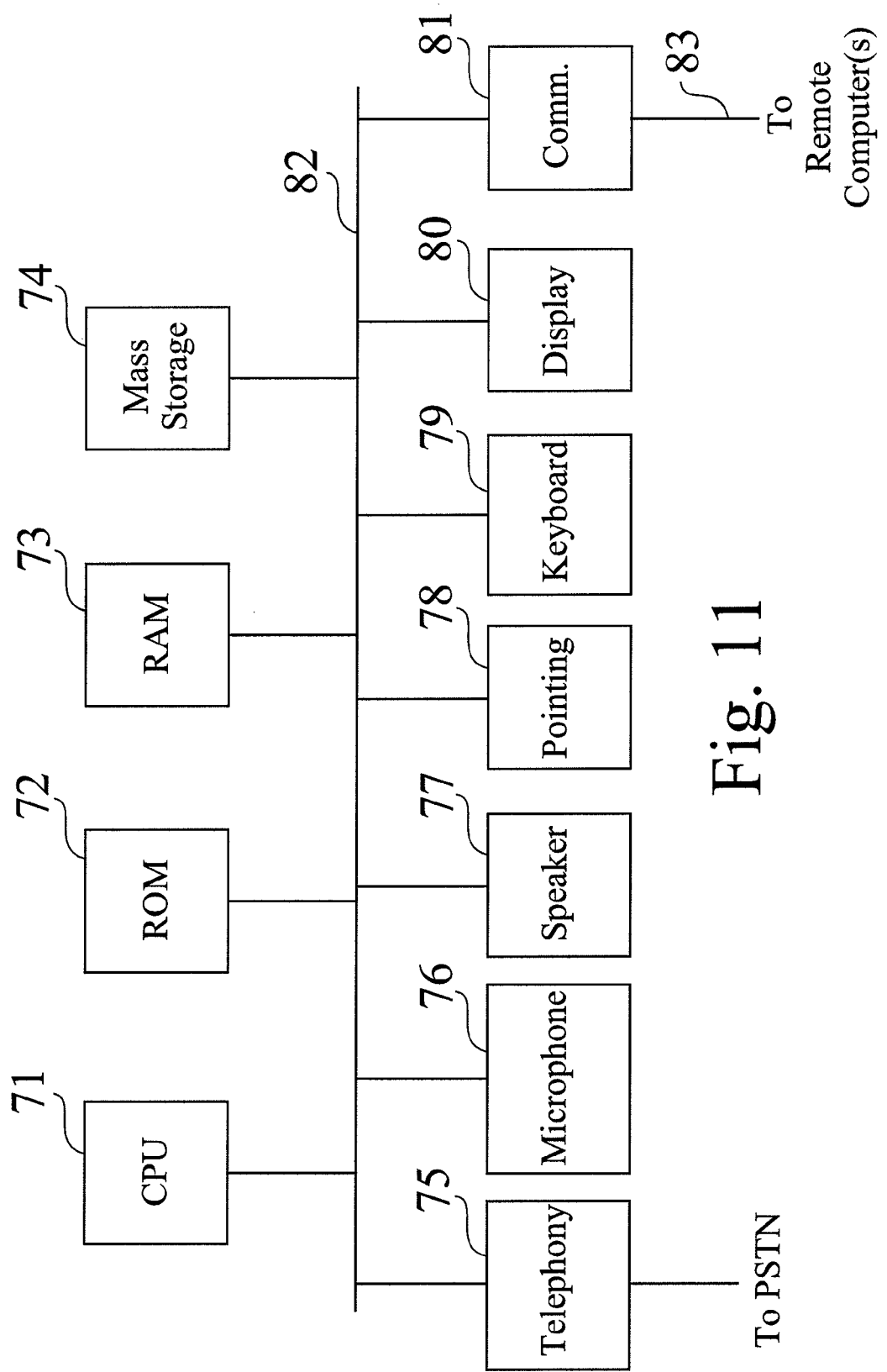
FIG. 11 shows an example of a computer system that can implement the components and operations of the preceding figures.

FIG. 11 illustrates an example of a computer system in which the aforementioned components and techniques can be implemented. It will be recognized that many variations upon the illustrated system can be used to implement these components and techniques. The illustrated computer system includes a central processing unit (CPU) 71 (e.g., a microprocessor), read-only memory (ROM) 72, random access memory (RAM) 73, and a mass storage device 74, each coupled to a bus system 82. The bus system 82 may include one or more physical buses coupled to each other through one or more bridges, controllers and/or adapters. For example, the bus system 82 may include a "system bus" coupled to one or more peripheral buses, such as a form of peripheral component interconnect (PCI) bus, universal serial bus (USB), or the like. Also coupled to the bus system are a telephony interface 75, an audio subsystem that includes a microphone 76 and a speaker 77, a pointing device 78, a keyboard 79, a display device 80, and a data communication device 81.

The mass storage device 74 may include any suitable device for storing large volumes of data, such as a magnetic disk or tape, magneto-optical (MO) storage device, flash memory, or any of various types of Digital Versatile Disk (DVD) or compact disk (CD) storage. The telephony interface 75 provides the computer system with a telephone connection to a remote caller via the PSTN or a computer network such as the Internet. The telephony interface 75 may also include equipment for digitizing and ends pointing to speech received over the telephone connection, to condition the input speech for processing by the speech recognizer. The microphone 76 and speaker 77 may be components of a telephone I/O device (i.e., handset or headset), such as illustrated in FIG. 1 and FIG. 3, to allow a user of the computer system (e.g., the directory assistance operator) to speak with the remote caller. The pointing device 78 may be any suitable device for enabling a user to position a cursor or pointer on the display device 17, such as a mouse, trackball, touchpad, touch-sensitive display screen, or the like. The display device 80 may be any device suitable for displaying alphanumeric, graphical and/or video data to a user, such as a cathode ray tube (CRT), a liquid crystal display (LCD), or the like. The data communication device 81 may be any device suitable for enabling the computer system to communicate data with a remote processing system over communication link 83, such as a conventional telephone modem, a cable modem, an Integrated Services Digital Network (ISDN) adapter, a Digital Subscriber Line (DSL) adapter, an Ethernet adapter, or the like. Speech from a caller such as described above may be received from a computer network through the communication device 81.

Thus, a method of operating and training an automated call handling system has been described.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method, comprising the steps of:
receiving a speech signal from a caller;
producing a speech recognition string based on the received speech signal;
determining if there is destination information that matches the speech recognition string;
wherein if there is destination information that matches the speech recognition string, the method proceeds with any of
outputting the destination information to the caller, or
connecting the caller to a destination that corresponds to the matching destination information; and
wherein if no destination information matches the speech recognition string, the method proceeds with
directing the caller to an operator to initiate an interaction,
providing the operator with request information that comprises any of the received speech signal or a request by the caller for the destination during the interaction;
recording destination identifying information input from the operator in response to the request information, and
the method proceeds with any of
outputting the recorded destination identifying information to the caller, or
connecting the caller to the matched destination using the recorded destination identifying information.

2. The method of claim 1, further comprising the step of:
updating a destination map using
speech information comprising any of the speech recognition string or the recorded speech that represents the request by the caller for the destination,
the recorded destination identifying information input from the operator, and
an association between the speech information and the recorded destination identifying information input from the operator.

3. The method of claim 1, further comprising the steps of:
associating the recorded speech that represents the request by the caller for the destination with the recorded destination identifying information; and
updating a destination map using the recorded speech that is associated with the recorded destination identifying information.

4. The method of claim 3, further comprising the step of:
associating recognized speech from a subsequent caller with a corresponding destination using the updated destination map.

5. The method of claim 3, wherein the updated destination map is accessible to one or more call handling systems.

6. The method of claim 1, wherein the destination comprises any of a telephone number, an address, a name, a part of an organization, a topic, a category, an entity, or information.

7. The method of claim 1, wherein the destination identifying information is input from the operator by any of a keyboard, a mouse, a pointing device, a touch-sensitive device, or other input device.

8. The method of claim 1, wherein the step of determining that there is no destination information that matches the speech recognition string is based upon any of
having low confidence with a listing hypothesis, or
receiving an indication from the caller that a proposed destination is incorrect.

9. The method of claim 1, further comprising the step of:
creating a disambiguation dialog for the speech recognition string, based on the interaction between the caller and the operator.

10. The method of claim 1, further comprising the steps of:
detecting a specified characteristic in the interaction between the caller and the operator, wherein the specified characteristic is associated with a level of confidence in the interaction;
updating the destination map using the detected specified characteristic; and
associating recognized speech from a subsequent caller with a corresponding destination using the updated destination map.

11. An apparatus, comprising:
a storage for storing a destination map comprising a plurality of destination information;
an interface for receiving a speech signal from a caller;
a recognizer module for producing a speech recognition string based on the received speech signal; and
at least one processor programmed to determine if there is destination information that matches the speech recognition string;
wherein if there is destination information that matches the speech recognition string, the processor is programmed to any of output the destination information to the caller, or connect the caller to a destination that corresponds to the matching destination information; and wherein if there is no destination information that matches the speech recognition string, the processor is programmed to direct the caller to an operator to initiate an interaction, provide the operator with any of the received speech signal or a request by the caller for the destination during the interaction, record destination identifying information input from the operator in response to the request by the caller, and proceed to any of output the recorded destination identifying information to the caller, or connect the caller to the matched destination using the recorded destination identifying information.

12. The apparatus of claim 11, wherein the at least one processor is further programmed to update a destination map using speech information comprising any of the speech recognition string or the recorded speech that represents the request by the caller for the destination, the recorded destination identifying information input from the operator, and an association between the speech information and the recorded destination identifying information input from the operator.

13. The apparatus of claim 11, wherein the at least one processor is further programmed to associate the recorded speech that represents the request by the caller for the destination with the recorded destination identifying information, and update a destination map using the recorded speech that is associated with the recorded destination identifying information.

14. The apparatus of claim 13, wherein the at least one processor is further programmed to associate recognized speech from a subsequent caller with a corresponding destination using the updated destination map.

15. The apparatus of claim 13, wherein the updated destination map is accessible to one or more call handling systems.

16. The apparatus of claim 11, wherein the destination comprises any of a telephone number, an address, a name, a part of an organization, a topic, a category, an entity, or information.

17. The apparatus of claim 11, further comprising:

an input device for entry of the destination identifying information by the operator.

18. The apparatus of claim 11, wherein the determination by the at least one processor that there is no destination information that matches the speech recognition string is based upon any of a low confidence with a listing hypothesis, or an indication received from the caller that a proposed destination is incorrect.

19. The apparatus of claim 11, wherein the at least one processor is further programmed to create a disambiguation dialog for the speech recognition string, based on the interaction between the caller and the operator.

20. The apparatus of claim 11, wherein the at least one processor is further programmed to detect a specified characteristic in the interaction between the caller and the operator, wherein the specified characteristic is associated with a level of confidence in the interaction;

update the destination map using the detected specified characteristic; and associate recognized speech from a subsequent caller with a corresponding destination using the updated destination map.

21. The apparatus of claim 11, wherein the recognizer module is programmed to access at least one language model to recognize the received speech signal.

22. A method, comprising the steps of:

providing a destination map, wherein the destination map comprises destination identifying information corresponding to a plurality of destinations, and a plurality of stored speech recognition strings associated with the destination identifying information;

receiving a voice signal from a caller, wherein the voice signal comprises a request for a destination;

producing a speech recognition string based on the received voice signal;

calculating a listing hypothesis for a selected one of the plurality of destinations using the produced speech recognition string;

directing a caller to an operator when any of the system has low confidence with a listing hypothesis for the selected destination, or when the caller responds negatively to confirmation of the selected destination;

receiving information from an interaction between the caller and the operator; and updating the destination map based on the received information.

* * * * *